United States Patent
Chesneau

(10) Patent No.: US 10,944,324 B2
(45) Date of Patent: Mar. 9, 2021

(54) METHOD FOR OPERATING A SWITCHED MODE POWER SUPPLY OF THE BUCK TYPE AND CORRESPONDING SWITCHED MODE POWER SUPPLY

(71) Applicant: STMicroelectronics (Grenoble 2) SAS, Grenoble (FR)

(72) Inventor: David Chesneau, Grenoble (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 0 days.

(21) Appl. No.: 16/600,079

(22) Filed: Oct. 11, 2019

(65) Prior Publication Data

US 2020/0136516 A1 Apr. 30, 2020

(30) Foreign Application Priority Data

Oct. 25, 2018 (FR) ...................... 1859865

(51) Int. Cl.
*H02M 3/158* (2006.01)

(52) U.S. Cl.
CPC ................. *H02M 3/1588* (2013.01)

(58) Field of Classification Search
CPC ....... H02M 3/1588; H02M 2001/0025; H02M 2001/0016; H02M 2001/0032; H02M 3/158; H02M 1/083
See application file for complete search history.

(56) References Cited

U.S. PATENT DOCUMENTS

| | | |
|---|---|---|
| 2009/0160412 A1 | 6/2009 | Latham et al. |
| 2013/0015904 A1* | 1/2013 | Priel .................... G06F 1/3287 327/419 |
| 2019/0393796 A1* | 12/2019 | Fukushima ............ H02M 1/32 |

FOREIGN PATENT DOCUMENTS

| | | |
|---|---|---|
| EP | 1213822 A1 | 6/2002 |
| WO | 9610287 A1 | 4/1996 |

* cited by examiner

*Primary Examiner* — Adolf D Berhane
*Assistant Examiner* — Afework S Demisse
(74) *Attorney, Agent, or Firm* — Slater Matsil, LLP

(57) ABSTRACT

In an embodiment, a method for operating a voltage step-down switched mode power supply includes delivering an output voltage with an output stage having a power transistor that is cyclically made conducting by a first control signal. In PWM mode, the method includes generating an error voltage based on the output voltage and a reference voltage, and applying a first delay on a first control signal. The first delay is determined so as to reduce a difference between the error voltage and the reference voltage.

27 Claims, 4 Drawing Sheets

METHOD FOR OPERATING A SWITCHED MODE POWER SUPPLY OF THE BUCK TYPE AND CORRESPONDING SWITCHED MODE POWER SUPPLY

CROSS-REFERENCE TO RELATED APPLICATIONS

This application claims priority to French Application No. 1859865, filed on Oct. 25, 2018, which application is hereby incorporated herein by reference.

TECHNICAL FIELD

The present disclosure relates generally to an electronic system and method, and, in particular embodiments, to a method for operating a switched mode power supply (SMPS) of the buck type and corresponding switched mode power supply.

BACKGROUND

The PWM or PFM operating mode of a voltage step-down switched mode power supply is generally determined according to an output current and a regulated output voltage level delivered at the output of the switched mode power supply.

Generally, such a switched mode power supply comprises a first transistor referred to as "high-side" and a second transistor referred to as "low-side" or a diode, known to the person skilled in the art as a free-wheeling diode, which are coupled in series between the power supply and ground.

The first high-side transistor is cyclically made conducting by a first control signal and a second low-side transistor is cyclically made conducting by a second control signal.

In pulse width modulation mode, the first and second transistors are alternately made conducting by the first and second control signals.

In pulse frequency modulation mode, the first and second transistors can additionally be made non-conducting at the same time as a function of the first and second control signals.

When a high output current is required in response to a load of the power supply, the power supply operates in pulse width modulation mode and the period/frequency of the control signal is hence fixed.

In this pulse width modulation mode, the power supply is configured to generate via a signal generator circuit of the power supply an error voltage as a function of the output voltage and a reference voltage and to generate via a ramp generation circuit a ramp voltage which increases from zero up to the error voltage so as to determine the duration of the first state of the control signal.

During a light load (i.e., low output current supplied to the load), the switched mode power supply operates in pulse frequency modulation mode and the frequency of the control signal is, as a result, variable.

In this pulse frequency modulation mode, the power supply is configured to generate the ramp voltage and to vary the period/frequency of the control signal as a function of a comparison between the ramp voltage and the reference voltage via a comparator.

It is known to the person skilled in the art that the output voltage of the power supply oscillates strongly at the moment of a transition from pulse width modulation mode to pulse frequency modulation mode or of a transition from pulse frequency modulation mode to pulse width modulation mode if, at that moment, the error voltage and the reference voltage are not equal.

There is thus a need to propose a technical solution that is low in complexity and low in cost, and provides for softening the transitions between pulse width modulation mode and pulse frequency modulation mode and improving the performance of the switched mode power supply.

SUMMARY

Implementations and embodiments of the invention relate to switched mode power supplies (SMPSs), more particularly voltage step-down ("buck") switched mode power supplies, intended to operate in a pulse width modulation (PWM) mode or in a pulse frequency modulation (PFM) mode.

According to one aspect, there is proposed a method for regulating a voltage step-down switched mode power supply.

In some embodiments, the power supply is configured to deliver an output voltage and includes a power transistor configured to be cyclically made conducting by a first control signal.

In some embodiments, the power supply is intended to operate in a pulse width modulation mode in which it is configured to generate an error voltage from the output voltage and from a reference voltage, or in a pulse frequency modulation mode.

In some embodiments, the method comprises an application, in pulse width modulation mode, of a first delay on the control signal. The first delay is determined so as to reduce the difference between the error voltage and the reference voltage, especially at the transitions between pulse width modulation mode and pulse frequency modulation mode.

In some embodiments, the switched mode power supply is typically configured to generate a ramp voltage controlled by an additional control signal. This ramp voltage is compared with the error voltage in pulse width modulation mode or with the reference voltage in pulse frequency modulation mode. The first control signal and the additional control signal are then generated from this comparison.

However, due to the intrinsic propagation time of the signals, within the supply, notably for the comparison between the error voltage and the ramp voltage, the ramp voltage always reaches the error voltage earlier than in the ideal case of a power supply without intrinsic propagation time.

It is appropriate to note that the switched mode power supply operates as a closed loop and is configured to generate a good value of the duty cycle of the first control signal so as to make the output voltage equal to the reference voltage, regardless of the input voltage of the switched mode power supply.

Moreover there is a difference between the error voltage and the reference voltage notably as a function of the input voltage of the switched mode power supply. The greater this input voltage, the greater the difference between the error voltage and the reference voltage.

Applying the first delay on the first control signal when the power supply operates in pulse width modulation mode advantageously provides for starting the generation of the ramp voltage before the power transistor is made conducting so as to compensate for the intrinsic propagation time and to reduce the difference between the error voltage and the reference voltage, and reducing, or even eliminating, the influence of the input voltage on the quality of the transition between pulse frequency modulation mode and pulse width modulation mode.

As such, the transitions between pulse width modulation mode and pulse frequency modulation mode become more stable and bring about less oscillations on the output voltage.

Moreover, the error voltage also becomes more stable and more precise control on the output voltage of the switched mode power supply can be achieved, which is critical in order to control the energy consumption of a microcontroller including such a switched mode power supply.

According to one embodiment, the supply is configured to generate, in pulse width modulation mode, a first intermediate signal from the error voltage and from a ramp voltage. In an embodiment, the first delay is equal to the duration of the generation of the first intermediate signal.

It is appropriate to note that the intrinsic propagation time of the power supply in pulse width modulation mode is for example mainly linked to a comparator intended to receive the error voltage and the ramp voltage and configured to generate the first intermediate signal.

Consequently, the first delay applied corresponds to this propagation time.

According to another embodiment, the method additionally includes an application, in pulse frequency modulation mode, of a second delay on the first control signal.

The supply can for example be configured to generate, in pulse frequency modulation mode, a second intermediate signal from the reference voltage and from a ramp voltage. In an embodiment, the second delay is equal to the duration of the generation of the second intermediate signal.

Advantageously, in pulse frequency modulation mode, this second delay, corresponding to the intrinsic propagation time of another comparator intended to receive the reference voltage and the ramp voltage and configured to generate the second intermediate signal, can also be compensated for.

By way of non-limiting indication, the first and second delays can for example be equal.

According to another embodiment, the method comprises a transition from pulse frequency modulation mode to pulse width modulation mode when first transition conditions are fulfilled.

The supply typically additionally includes a synchronous transistor and a power inductor which is coupled both to the power transistor and to the synchronous transistor and configured to deliver an inductance current flowing through the power inductor.

Also, according to one embodiment, the fulfilled first transition conditions include a detection of a passing of the inductance current through zero in a predetermined direction and a detection of the output voltage lower than the reference voltage.

According to yet another embodiment, the method comprises a transition from pulse width modulation mode to pulse frequency modulation mode when second transition conditions are fulfilled.

The fulfilled second transition conditions include for example a detection of a passing of the inductance current through zero in a predetermined direction and a detection of the first control signal in a state making the power transistor conducting.

The predetermined direction can for example correspond to a passing of the inductance current through zero from its positive values.

According to another aspect, there is proposed a voltage step-down switched mode power supply configured to deliver an output voltage and including a power transistor configured to be cyclically made conducting by a first control signal.

The power supply is intended to operate in a pulse width modulation mode or in a pulse frequency modulation mode.

The power supply includes a processing circuit configured to generate an error voltage from the output voltage and from a reference voltage and to apply in pulse width modulation mode a first delay on the control signal, the first delay being determined so as to reduce the difference between the error voltage and the reference voltage, especially at the transitions between pulse width modulation mode and pulse frequency modulation mode.

According to one embodiment, the processing circuit includes a first signal generator circuit intended to receive the error voltage and a ramp voltage.

The first signal generator circuit has a first intrinsic propagation time. The first delay is equal to the first intrinsic propagation time.

According to another embodiment, the processing circuit is additionally configured to apply, in pulse frequency modulation mode, a second delay on the first control signal.

The processing circuit can for example include a second signal generator circuit configured to generate, in pulse frequency modulation mode, a second intermediate signal from the reference voltage and from a ramp voltage.

The second signal generator circuit has a second intrinsic propagation time, and the second delay is equal to the second intrinsic propagation time.

The first and second delays can be equal.

According to another embodiment, the power supply additionally includes a control circuit configured to make the supply change from pulse frequency modulation mode to pulse width modulation mode when first transition conditions are fulfilled.

As indicated above, the power supply typically includes a synchronous transistor and a power inductor which is coupled both to the power transistor and to the synchronous transistor and is configured to deliver an inductance current flowing through the power inductor.

According to one embodiment, the processing circuit additionally includes a detection circuit configured to detect a passing of the inductance current through zero in a predetermined direction and to compare the output voltage and the reference voltage.

The fulfilled first transition conditions include a detection of the passing of the inductance current through zero in a predetermined direction and a detection of the output voltage (or a first voltage based on the output voltage, such as a scaled version of the output voltage) lower than the reference voltage.

According to yet another embodiment, the control circuit is additionally configured to make the power supply change from pulse width modulation mode to pulse frequency modulation mode when the second transition conditions are fulfilled.

The fulfilled second transition conditions include for example a detection of the passing of the inductance current through zero in a predetermined direction and a detection of the first control signal in a state that makes the power transistor conducting.

The predetermined direction can for example correspond to a passing of the inductance current through zero from its positive values.

According to another aspect, a power supply management unit is proposed, comprising at least one voltage step-down switched mode power supply as defined above.

According to yet another aspect, a microcontroller is proposed, incorporating a power supply management unit as defined above.

According to yet another aspect, an electronic apparatus is proposed, such as a connected object, incorporating at least one microcontroller as defined above.

Other advantages and features of the invention will become clearer upon examining the detailed description of implementations and embodiments, which are not at all limiting, and the accompanying drawings in which:

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
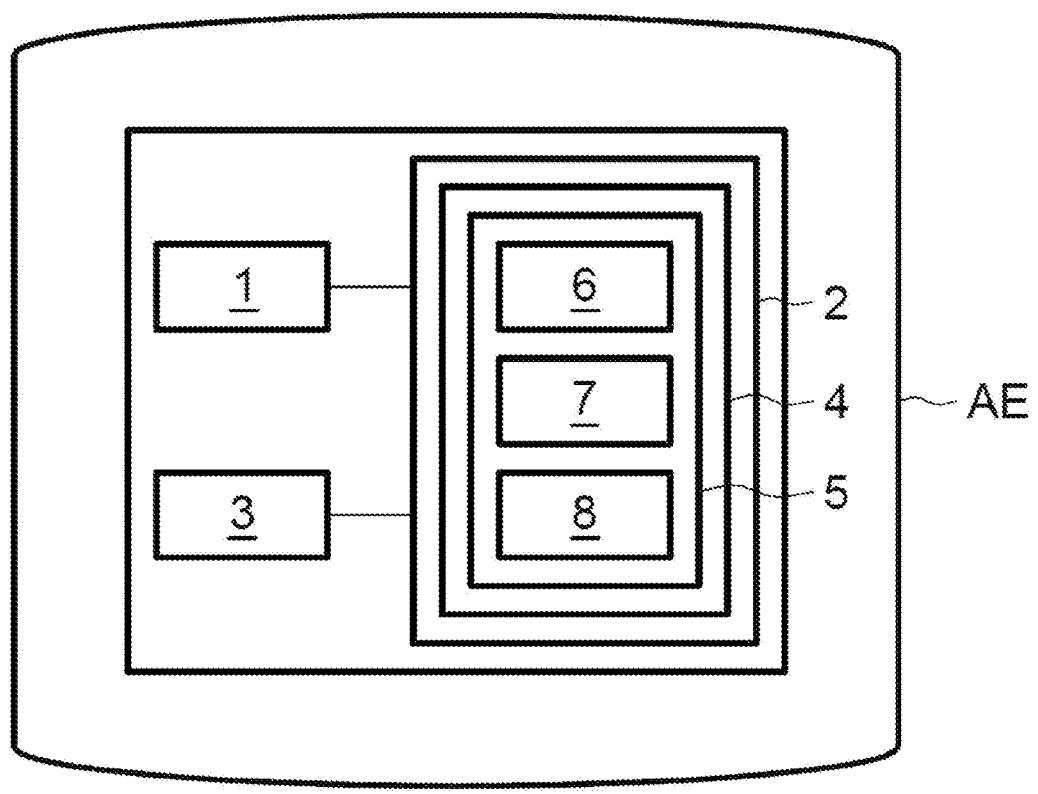
FIGS. 1 to 6 schematically illustrate implementations and embodiments of the invention.

The reference AE in FIG. 1 denotes an electronic apparatus, in this case for example a connected intelligent apparatus of the connected thermostat type AE.

The connected thermostat AE comprises a detection stage 1 configured to detect ambient parameters such as ambient temperature and ambient humidity around the thermostat AE, a processing circuit 2 coupled to the detection stage 1 and configured to process parameters detected by the detection stage 1, and a communication circuit 3 coupled to the processing circuit 2 and configured to communicate with another connected object or a server via an Internet network.

The processing circuit 2 includes a microcontroller 4, in this case for example an STM32® microcontroller which is commercially available from the company STMicroelectronics.

The microcontroller 4 includes a power supply management unit 5 configured to dynamically manage various power supplies and including at least one oscillator 6, a finite state machine (FSM) 7 and at least one switched mode power supply 8 configured to deliver one or more stable internal supply voltages.

For simplification, only one voltage step-down (or "buck") switched mode power supply 8, for example, is illustrated here, intended to operate in a pulse width modulation PWM mode or in a pulse frequency modulation PFM mode known to the person skilled in the art.

Figure 2:
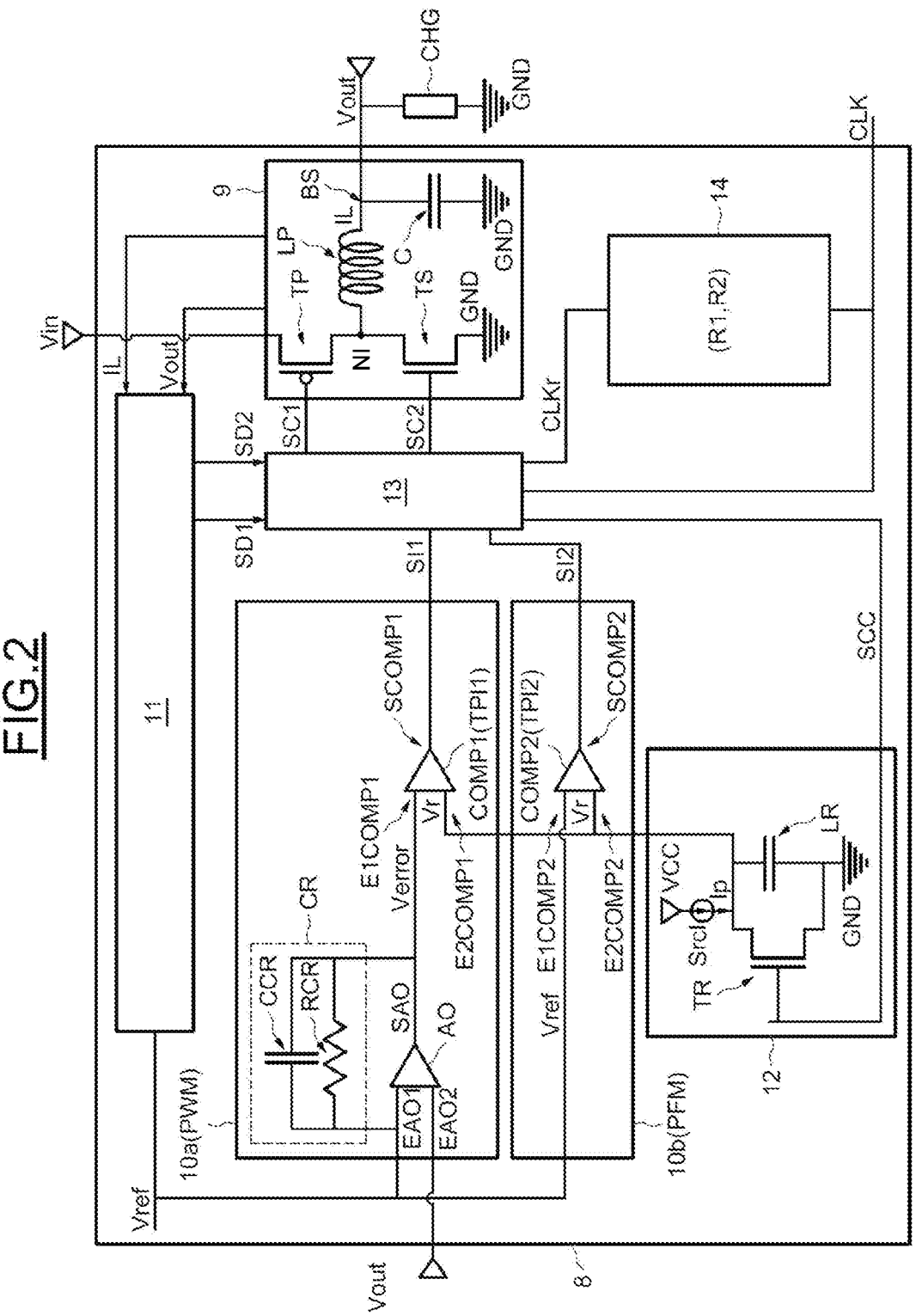

Reference is now made to FIG. 2 to illustrate in greater detail an example embodiment of the switched mode power supply 8.

As shown in FIG. 2, the switched mode power supply 8 includes: a chopper 9, a processing circuit that includes a first signal generator circuit 10a, a second signal generator circuit bob, a detection circuit 11, a ramp generation stage 12 and a delay stage 14, and a control circuit 13.

The chopper 9 includes a power transistor TP (e.g., a P-type MOS transistor) coupled between a supply voltage (e.g., an input voltage Vin) and an intermediate node NI, a transistor TS (e.g., an N-type MOS transistor) coupled between the intermediate node NI and ground GND. A power inductor LP is coupled between the intermediate node NI and an output terminal BS, and a capacitor C is coupled between the output terminal BS and ground GND.

The chopper 9 is configured to deliver an output voltage Vout on the output terminal BS and an inductance current IL flowing through the power inductor LP.

The gate of the power transistor TP is intended to receive a first control signal SC1, while the gate of the transistor TS is intended to receive a second control signal SC2.

In pulse width modulation PWM mode, when the first control signal SC1 is in a first state (which makes the power transistor TP conducting), the transistor TS (controlled by the second control signal SC2) is in its blocked state.

Conversely, in PWM mode, when the first control signal SC1 is in a second state (which makes the power transistor TP non-conducting), the transistor TS is in its conducting state.

In an embodiment, in PWM mode, the transistor TS is controlled by the same control signal SC1 as the one controlling the power transistor TP and is in a blocked state when the power transistor TP is in a conducting state and vice versa. Transistor TS is denoted by the designation of "synchronous" transistor, which is well-known to the person skilled in the art.

However, in PFM mode, beyond the two cases described for PWM mode, the first and second control signals SC1 and SC2 can both be in a state which makes the power transistor TP and the transistor TS non-conducting.

The transistor TS nonetheless retains designation of "synchronous transistor."

The detection circuit 11 is coupled to the chopper 9 and intended to receive the inductance current IL, the output voltage Vout and a reference voltage Vref.

The detection circuit 11 is configured to detect a passing of the inductance current IL through zero in a predetermined direction, in this case for example from its positive values, and to deliver a first detection signal SD1 representing the result of the detection.

By way of example, the first detection signal SD1 is in a high state ("1") when the value of the inductance current IL falls to zero.

The detection circuit 11 is additionally configured to compare the output voltage Vout and a reference voltage Vref. The reference voltage Vref is for example the value of the output voltage Vout desired.

To this end, the detection circuit 11 is configured to deliver a second detection signal SD2, the value of which represents the result of the comparison.

The second detection signal SD2 can for example be in a high state ("1") when the output voltage Vout is lower than the reference voltage, and in a low state ("0") when the output voltage Vout is higher than the reference voltage Vref.

The ramp generation stage 12 includes a ramp transistor TR (e.g., of the N-type) having a gate coupled to an additional control signal SCC, a current source SrcI coupled between a power supply VCC and the drain of the ramp transistor TR and configured to deliver a bias current Ip, and a ramp capacitor LR charged by the bias current Ip and coupled between the drain of the ramp transistor TR and ground GND.

When the additional control signal SCC is in a high state ("1") making the ramp transistor TR conducting, the ramp transistor TR is in a conducting state so as to connect the drain of the ramp transistor TR to ground GND. As such, the voltage on the drain of the ramp transistor TR, in other words the ramp voltage Vr, falls back to zero.

When the additional control signal SCC is in a low state ("0") making the ramp transistor TR non-conducting, the ramp transistor TR is in a blocked state and the bias current Ip begins to charge the ramp capacitor LR so as to increase the ramp voltage Vr.

The first signal generator circuit 10a includes an operational amplifier AO having a first input EAO1 intended to receive the reference voltage Vref, and a second input EAO2 intended to receive the output voltage Vout, and a feedback circuit CR coupled to the operational amplifier AO.

For simplification, a simplified feedback circuit CR as illustrated here, which comprises a feedback resistor RCR and a feedback capacitor CCR coupled in parallel between the first input EAO1 and the output SAO.

The operational amplifier AO and the associated feedback circuit CR are configured to amplify the difference between the output voltage Vout and the reference voltage Vref so as to generate at the output SAO of the operational amplifier AO an error voltage Verror.

The first signal generator circuit 10a additionally includes a first comparator COMP1, the first input E1COMP of which is intended to receive the error voltage Verror, and the second input E2COMP of which is coupled to the ramp generation stage 12 and intended to receive the ramp voltage Vr.

The first comparator COMP1 is configured to generate at the output SCOMP1 a first intermediate signal SI1 as a function of the error voltage Verror and the ramp voltage Vr.

By way of indication, the first intermediate signal SI1 is in a high state when the ramp voltage Vr is lower than the error voltage Verror and in a low state when the ramp voltage Vr is higher than the error voltage Verror.

The duration of the high state of the first intermediate signal SI1 corresponds to a growing period of the ramp voltage Vr which is variable as a function of the error voltage Verror.

Since the error voltage Verror is generated as a function of the difference between the reference voltage Vref and the output voltage Vout, this duration of the high state of the first intermediate signal SI1 is also a function of the reference voltage Vref and the output voltage Vout.

Consequently, the first intermediate signal SI1 is a cyclic signal and its duty cycle depends on the difference between the reference voltage Vref and the output voltage Vout.

Since the first signal generator circuit 10a includes the first comparator COMP1 comprises several transistors, which brings about a relatively significant processing time with respect to the period of the clock signal CLK, the first signal generator circuit 10a therefore has a first intrinsic propagation time TPI1, in other words a time required for the propagation of signals within the first signal generator circuit 10a.

It is appropriate to note that the first signal generator circuit 10a is configured to be used in pulse width modulation PWM mode while the second signal generator circuit bob is configured to be used in pulse frequency modulation PFM mode.

The second signal generator circuit bob includes a second comparator COMP2 having a first input E1COMP2 intended to receive the reference voltage Vref, and a second input E2COMP2 intended to receive the ramp voltage Vr.

The second signal generator circuit bob is configured to generate at its output SCOMP2 a second intermediate signal SI2 as a function of the reference voltage Vref and the ramp voltage Vr.

The second comparator COMP2 also comprises several transistors, which generates a second intrinsic propagation time TPI2 for the second signal generator circuit bob.

As a variant, this additional second intrinsic propagation time TPI2 can also be compensated for when the power supply 8 operates in pulse frequency modulation PFM mode.

However, since the reference voltage Vref used in order to be compared with the ramp voltage Vr is a fixed voltage, compensating for the second intrinsic propagation time TPI2 is optional.

It is appropriate to note that the first intermediate signal SI1 is delivered by the first signal generator circuit 10a for pulse width modulation PWM mode and that the second intermediate signal SI2 is delivered by the second signal generator circuit bob for pulse frequency modulation PFM mode.

By way of example, the first and second comparators COMP1, COMP2 can be identical and the first and second intrinsic propagation times TPI1, TPI2 can be equal.

The control circuit 13 may be, e.g., a digital controller, for example of the Finite State Machine (FSM) type, and is intended to receive the first and second immediate signals SI1, SI2, the first and second detection signals SD1, SD2, a clock signal CLK and a delayed clock signal CLKr.

The delay stage 14 is intended to receive the clock signal CLK and configured to deliver the delayed clock signal CLKr having for pulse width modulation PWM mode, a first delay R1 which is equal to the first intrinsic propagation time TPI1 of the first signal generator circuit 10a, and for pulse frequency modulation PFM mode, a second delay R2 which is equal to the second intrinsic propagation time TPI2 of the second signal generator circuit bob.

For the case in which the first and second intrinsic propagation times TPI1, TPI2 are equal, the first and second delays R1, R2 are also equal.

The first and second intrinsic propagation times TPI1, TPI2 can for example be measured beforehand in a sampling phase.

Figure 3:
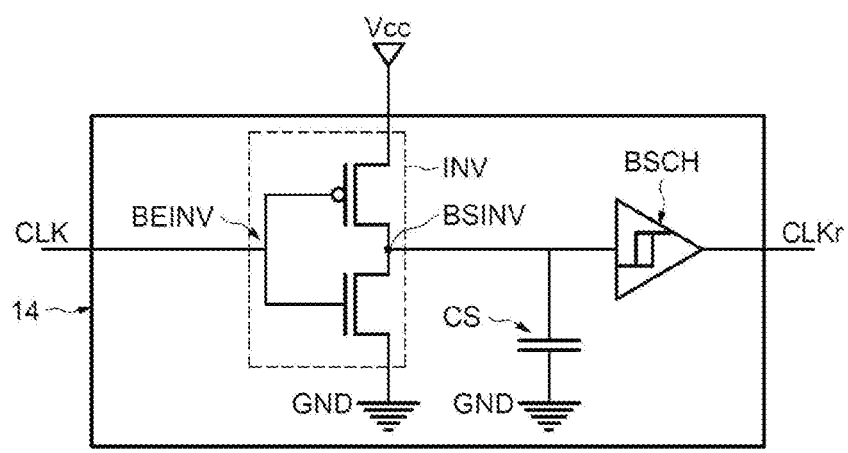

FIG. 3 illustrates an example embodiment of the delay stage 14 for the case in which the first and second delays R1, R2 are equal.

The delay stage 14 includes an inverter INV having a P-type MOS transistor and an N-type MOS transistor coupled in series between the supply voltage VCC and ground GND.

The gates of the P-type and N-type MOS transistors are coupled together so as to form an input terminal BEINV.

The drains of the P-type and N-type MOS transistors are coupled together so as to form an output terminal BSINV.

The delay stage 14 additionally includes a Schmitt trigger BSCH, the input of which is coupled to the output terminal BSINV, and an additional capacitor CS coupled between the output terminal BSINV and ground GND.

By appropriately choosing the dimensions of the transistors of the inverter INV, the delay stage 14 generates at the output of the Schmitt trigger BSCH the delayed clock signal CLKr having with respect to the clock signal CLK a delay which is close to, or even equal to, the first or second intrinsic propagation time TPI1, TPI2.

As a variant, the delay stage 14 can for example include the same structure as that of the first or second signal generator circuit 10a, 10b so as to reproduce more precisely the same first or second intrinsic propagation time TPI1 or TPI2.

The control circuit 13 is configured to generate the first and second control signals SC1, SC2 from first and second intermediate signals SI1, SI2.

The first and second control signals SC1, SC2 are for example different and not synchronized with the clock signal CLK when the switched mode power supply 8 operates in pulse frequency modulation PFM mode.

In that PFM mode, the frequency and the period of the first control signal SC1 can be modulated so as to respond to a low output current at the output terminal BS of the chopper 9.

In that case, starting the generation of the ramp voltage Vr and making the power transistor TP conducting can for example be synchronized.

Figure 4:
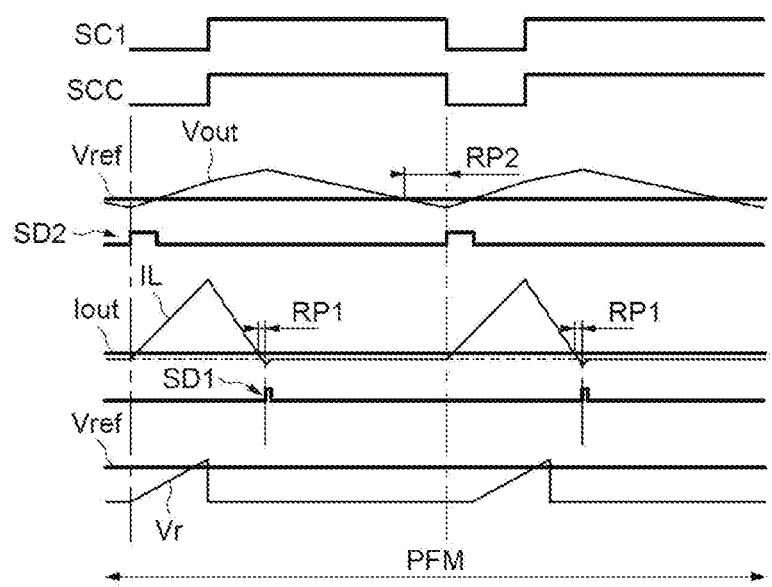

FIG. 4 illustrates a timing diagram of the switched mode power supply 8 operating in pulse frequency modulation PFM mode.

The top part of FIG. 4 illustrates the change in the output voltage Vout and the reference voltage Vref.

When the output voltage Vout is lower than the reference voltage Vref, the second detection signal SD2 is in the high state after a second predetermined delay RP2 corresponding to the duration of the comparison between the output voltage Vout and the reference voltage Vref carried out by the detection circuit 11 so as to trigger each period of the first control signal SC1 and of the additional control signal SCC.

When the first control signal SC1 is in the low state, the P-type power transistor TP is made conducting and the inductance current IL increases.

In the same period, the additional control signal SCC is also in the low state and the ramp voltage Vr increases so as to exceed the reference voltage Vref.

The second signal generator circuit 10*b* also has the second intrinsic propagation time TPI2. The second intermediate signal SI2 is in the high state at a moment corresponding to the instant when the ramp voltage Vr exceeds the reference voltage Vref increased by the second delay R2, equaling the second intrinsic propagation time TPI2.

The second intermediate signal SI2 triggers the switchovers of the control signal SC1 and the additional control signal SCC to the high state.

Following these switchovers, the inductance current IL falls and the ramp voltage Vr is reset to zero.

The detection circuit 11 is configured to generate the first detection signal SD1 in the high state at a moment corresponding to the instant when the inductance current IL passes below zero (becomes negative), increased by a predetermined first delay RP1 corresponding to the duration of the comparison between the inductance current IL and the value zero carried out by the detection circuit 11.

The control circuit 13 is additionally configured to make the power supply 8 change from pulse frequency modulation PFM mode to pulse width modulation PWM mode as a function of the detection of the passing of the inductance current IL through zero and of the comparison between the output voltage Vout and the reference voltage Vref.

Figure 5:
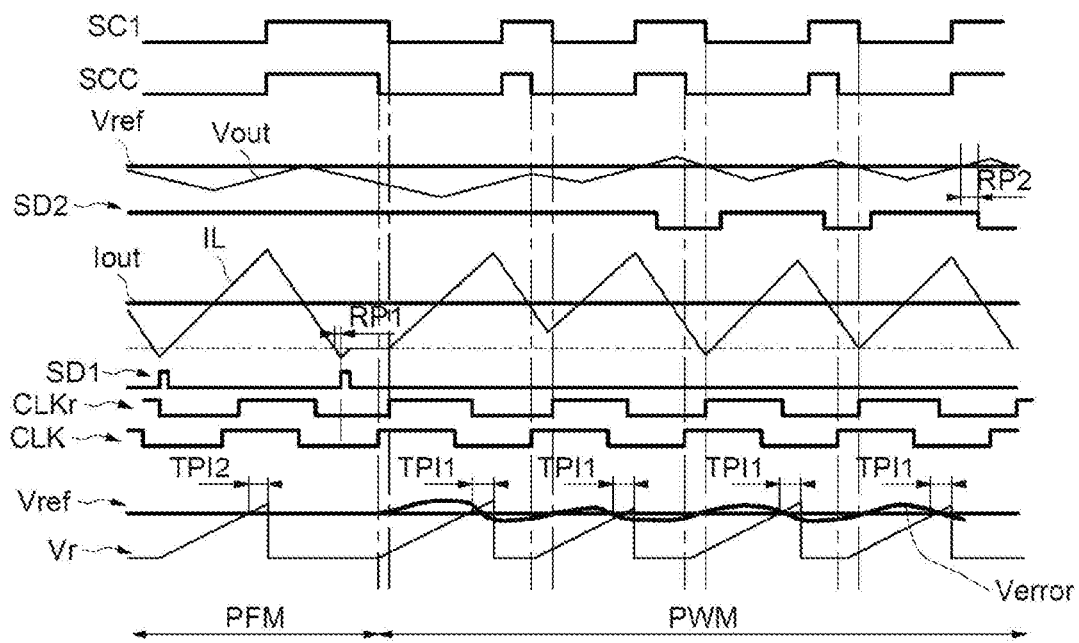

Reference is now made to FIG. 5 to illustrate the timing diagram of an example implementation of this transition from PFM mode to PWM mode.

It is observed that in the left-hand part of FIG. 5 the power supply 8 operates in pulse frequency modulation PFM mode and in the right-hand part of FIG. 5 the power supply 8 operates in pulse width modulation PWM mode.

When a passing of the inductance current IL through zero from its positive values is detected and the output voltage Vout is lower than the reference voltage Vref, the control circuit 13 is configured to make the power supply 8 change from pulse frequency modulation PFM mode to pulse width modulation PWM mode at the next rising edge of the clock signal CLK.

It can be observed in FIG. 5 that the frequency and the period of the first control signal SC1 and of the additional control signal SCC are constant during pulse width modulation PWM mode and that the first control signal SC1 is delayed with respect to the additional control signal SCC by a duration equal to the first intrinsic propagation time TPI1 of the first signal generator circuit 10*a*.

There will now be described, more particularly with reference to FIG. 6, a transition from PWM mode to PFM mode.

The control circuit 13 is configured to make the power supply 8 change from pulse width modulation PWM mode to pulse frequency modulation PFM mode as a function of the first and second detection signals SD1, SD2.

Figure 6:
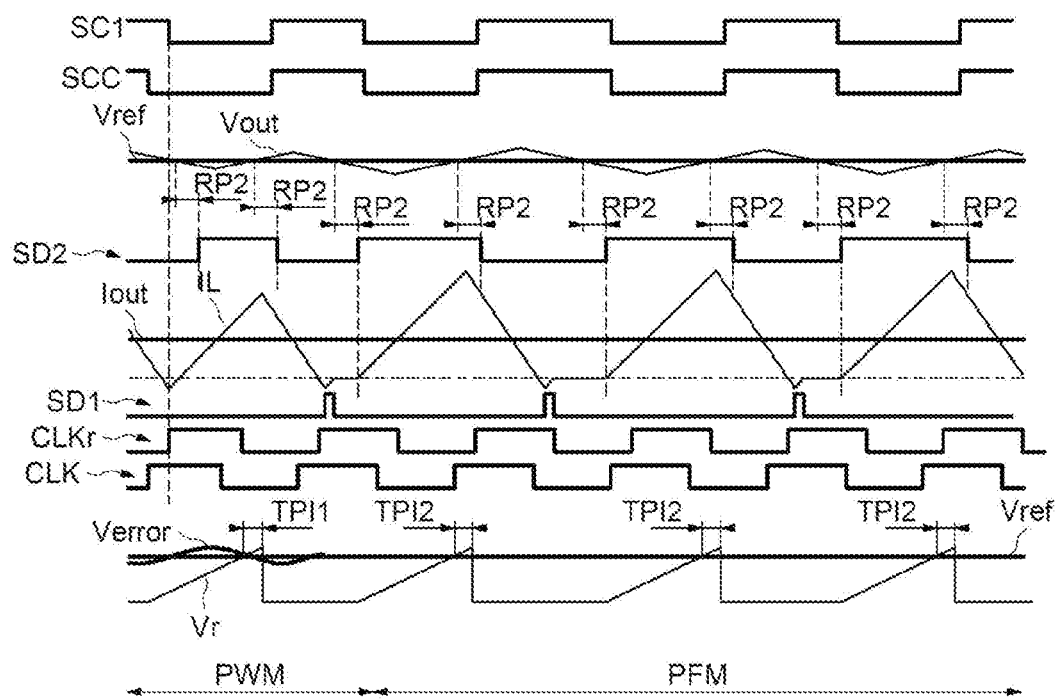

FIG. 6 illustrates the timing diagram of an example implementation of this transition from PWM mode to PFM mode.

It is observed that in the left-hand part of FIG. 6 the power supply 8 operates in pulse width modulation PWM mode and in the right-hand part of FIG. 6 the power supply 8 operates in pulse frequency modulation PFM mode.

When a passing of the inductance current IL through zero from its positive values is detected (in other words the first detection signal SD1 is in the high state), and when the low state of the first control signal SC1 is detected by the control circuit 13 (in other words the power transistor TP is made conducting), the control circuit 13 is configured to make the power supply 8 change from pulse width modulation PWM mode to pulse frequency modulation PFM mode at the next rising edge of the second detection signal SD2.

It can be observed in FIG. 6 that the frequency and the period of the first control signal SC1 and of the additional control signal SCC are variable during pulse frequency modulation PFM mode and that the first control signal SC1 is not delayed with respect to the additional control signal SCC.

It is appropriate to note that it is also possible to apply the first delay R1 equaling the first intrinsic propagation time TPI1 of the first signal generator circuit 10*a* between the first control signal SC1 and the additional control signal SCC during both PFM and PWM modes.

As such, at least the first intrinsic propagation time TPI1 of the first signal generator circuit 10*a* is compensated for in pulse width modulation PWM mode so as to stabilize the error voltage Verror, notably at the moment of the transition to one or the other of PWM and PFM modes, and to more precisely control the output voltage Vout of the switched mode power supply 8.

What is claimed is:

1. A method for operating a voltage step-down switched mode power supply, the method comprising:
   delivering an output voltage with an output stage having a power transistor that is cyclically made conducting by a first control signal; and
   when operating the switched mode power supply in a pulse width modulation (PWM) mode,
      generating an error voltage based on the output voltage and a reference voltage; and
      applying a first delay on the first control signal, the first delay being determined so as to reduce a difference between the error voltage and the reference voltage.

2. The method of claim 1, wherein generating the error voltage comprises comparing the output voltage with the reference voltage.

3. The method of claim 1, further comprising generating, when operating the switched mode power supply in the PWM mode, a first intermediate signal based on the error voltage and on a ramp voltage, wherein the first delay is about equal to a duration of the generation of the first intermediate signal.

4. The method of claim 1, further comprising transitioning the switched mode power supply from the PWM mode to a pulse frequency modulation (PFM) mode.

5. The method of claim 4, wherein the output stage further comprises a synchronous transistor coupled to the power transistor via an intermediate node, the intermediate node coupled to a power inductor, the method further comprising delivering an inductance current flowing through the power inductor to generate the output voltage, wherein transitioning the switched mode power supply from the PWM mode to the PFM mode comprises transitioning the switched mode power supply from the PWM mode to the PFM mode when the inductance current passes through zero in a predetermined direction and the first control signal is in a state that makes the power transistor conducting.

6. The method of claim 5, wherein the predetermined direction corresponds to a passing of the inductance current through zero from a positive value.

7. The method of claim 4, further comprising, when operating the switched mode power supply in the PFM mode, applying a second delay on the first control signal.

8. The method of claim 7, further comprising generating, when operating the switched mode power supply in the PFM mode, a second intermediate signal based on the reference voltage and a ramp voltage, wherein the second delay is about equal to a duration of the generation of the second intermediate signal.

9. The method of claim 7, wherein the first and second delays are about equal.

10. The method of claim 4, further comprising transitioning the switched mode power supply from the PFM mode to the PWM mode.

11. The method of claim 10, wherein the output stage further comprises a synchronous transistor coupled to the power transistor via an intermediate node, the intermediate node coupled to a power inductor, the method further comprising delivering an inductance current flowing through the power inductor to generate the output voltage, wherein transitioning the switched mode power supply from the PFM mode to the PWM mode comprises transitioning the switched mode power supply from the PFM mode to the PWM mode when the inductance current passes through zero in a predetermined direction and a first voltage based on the output voltage is lower than the reference voltage.

12. The method of claim 11, wherein the first voltage is equal to the output voltage.

13. The method of claim 11, wherein the predetermined direction corresponds to a passing of the inductance current through zero from a positive value.

14. A voltage step-down switched mode power supply comprising:
an output stage comprising a power transistor configured to be cyclically made conducting by a first control signal; and
a processing circuit configured to generate an error voltage based on an output voltage of the switched mode power supply and on a reference voltage and to apply, in a pulse width modulation (PWM) mode, a first delay on the first control signal, the first delay being determined so as to reduce a difference between the error voltage and the reference voltage.

15. The switched mode power supply of claim 14, wherein the processing circuit comprises a first signal generator circuit configured to generate, in PWM mode, a first intermediate signal based on the error voltage and a ramp voltage, the first signal generator circuit having a first intrinsic propagation time, wherein the first delay is about equal to the first intrinsic propagation time.

16. The switched mode power supply of claim 15, further comprising a ramp generator configured to generate the ramp voltage.

17. The switched mode power supply of claim 14, wherein the processing circuit is further configured to apply, in a pulse frequency modulation (PFM) mode, a second delay on the first control signal.

18. The switched mode power supply of claim 17, wherein the processing circuit comprises a second signal generator circuit configured to generate, in the PFM mode, a second intermediate signal based on the reference voltage and a ramp voltage, the second signal generator circuit having a second intrinsic propagation time, wherein the second delay is about equal to the second intrinsic propagation time.

19. The switched mode power supply of claim 17, wherein the first and second delays are about equal.

20. The switched mode power supply of claim 14, further comprising a control circuit configured to make the switched mode power supply change from a pulse frequency modulation (PFM) mode to the PWM mode to.

21. The switched mode power supply of claim 20, wherein the output stage further comprises a synchronous transistor configured to be coupled to a power inductor via an intermediate node, the intermediate node being coupled to the power transistor, wherein an inductance current is configured to flow through the power inductor, wherein the processing circuit further comprises a detection circuit configured to detect a passing of the inductance current through zero in a predetermined direction and to compare the output voltage and the reference voltage, wherein the control circuit is configured to make the switched mode power supply change from PFM to PWM when the inductance current passes through zero in a predetermined direction and a first voltage based on the output voltage is lower than the reference voltage.

22. The switched mode power supply of claim 14, further comprising a control circuit configured to make the switched mode power supply change from the PWM mode to a pulse frequency modulation (PFM) mode.

23. The switched mode power supply of claim 22, wherein the output stage further comprises a synchronous transistor configured to be coupled to a power inductor via an intermediate node, the intermediate node being coupled to the power transistor, wherein an inductance current is configured to flow through the power inductor, wherein the processing circuit further comprises a detection circuit configured to detect a passing of the inductance current through zero in a predetermined direction, wherein the control circuit is configured to make the switched mode power supply change from the PWM mode to the PFM mode when the inductance current passes through zero in a predetermined direction and the first control signal is in a state that makes the power transistor conducting.

24. The switched mode power supply of claim 23, wherein the predetermined direction corresponds to a passing of the inductance current through zero from a positive value.

25. A device comprising:
an output stage configured to generate an output voltage and comprising a power transistor configured to be cyclically made conducting by a first control signal;

a control circuit configured to receive a clock signal and a delayed clock signal and configured to generate the first control signal based on a first intermediate signal or on a second intermediate signal; and a processing circuit comprising:
- a ramp generator configured to generate a ramp voltage,
- a first signal generator circuit comprising an amplifier that is configured to generate, in a pulse width modulation (PWM) mode, an error voltage based on the output voltage and on a reference voltage, the first signal generator circuit configured to generate, in the PWM mode, the first intermediate signal based on the error voltage and the ramp voltage, the first signal generator circuit having a first intrinsic propagation time,
- a second signal generator circuit configured to generate, in a pulse frequency modulation (PFM) mode, the second intermediate signal based on the reference voltage and the ramp voltage, the second signal generator circuit having a second intrinsic propagation time, and
- a delay circuit configured to receive the clock signal, and generate, in the PWM mode, the delayed clock signal having a first delay with respect to the clock signal, the first delay being about equal to the first intrinsic propagation time, wherein the control circuit is configured to delay the first control signal by the first delay in PWM mode.

26. The device of claim 25, wherein the delay circuit is further configured to generate, in the PFM mode, the delayed clock signal having a second delay with respect to the clock signal, the second delay being about equal to the second intrinsic propagation time.

27. The device of claim 25, wherein the device is a microcontroller.

* * * * *